(12) United States Patent
Tsuchida et al.

(10) Patent No.: US 12,202,483 B2
(45) Date of Patent: Jan. 21, 2025

(54) DRIVING ASSISTANCE DEVICE AND DRIVING ASSISTANCE METHOD

(71) Applicants: DENSO CORPORATION, Kariya (JP); TOYOTA JIDOSHA KABUSHIKI KAISHA, Toyota (JP)

(72) Inventors: Norio Tsuchida, Kariya (JP); Naoki Kusumoto, Toyota (JP); Yuki Tezuka, Toyota (JP)

(73) Assignees: ASSIGNEEDENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 17/807,069

(22) Filed: Jun. 15, 2022

(65) Prior Publication Data
US 2022/0306108 A1   Sep. 29, 2022

Related U.S. Application Data

(63) Continuation of application No. PCT/JP2020/045262, filed on Dec. 4, 2020.

(30) Foreign Application Priority Data

Dec. 17, 2019   (JP) .................................. 2019-227097

(51) Int. Cl.
*B60W 30/00* (2006.01)
*B60W 30/18* (2012.01)
(Continued)

(52) U.S. Cl.
CPC ...... *B60W 30/18009* (2013.01); *B60W 40/04* (2013.01); *B60W 40/08* (2013.01);
(Continued)

(58) Field of Classification Search
CPC ........... B60W 30/18009; B60W 40/04; B60W 40/08; B60W 2540/18; B60W 2540/20; B60W 2552/00; B60W 2555/60
See application file for complete search history.

(56) References Cited

U.S. PATENT DOCUMENTS

2005/0265453 A1*  12/2005  Saito ....................... G06T 7/215
                                                                 375/240.24
2006/0207818 A1    9/2006  Fujioka et al.
(Continued)

FOREIGN PATENT DOCUMENTS

JP    H10-147160 A    6/1998
JP    H11-291790 A    10/1999
(Continued)

OTHER PUBLICATIONS

English Machine Translation of JP-3330624-B2, 2002, 38pages, provided by J-Plat Pat.*

*Primary Examiner* — Adam M Queler
*Assistant Examiner* — David Faber
(74) *Attorney, Agent, or Firm* — Maschoff Brennan

(57) ABSTRACT

A driving assistance device includes a determination unit configured to, in a case where a preceding vehicle located in front of a vehicle in a stopped state starts, determine whether an object is located inside a specified area that is a predetermined area in front of the vehicle, and a driving assistance unit configured to maintain the stopped state of the vehicle in a case where an object is located inside the specified area in a case where the preceding vehicle starts.

6 Claims, 14 Drawing Sheets

(51) Int. Cl.
*B60W 40/04* (2006.01)
*B60W 40/08* (2012.01)

(52) U.S. Cl.
CPC ..... *B60W 2540/18* (2013.01); *B60W 2540/20* (2013.01); *B60W 2552/00* (2020.02); *B60W 2555/60* (2020.02)

(56) References Cited

U.S. PATENT DOCUMENTS

| | | | |
|---|---|---|---|
| 2015/0106007 A1* | 4/2015 | Matsumura | G01C 21/26 701/408 |
| 2017/0228606 A1* | 8/2017 | Guan | G06T 7/90 |
| 2017/0267178 A1* | 9/2017 | Shiga | G06V 10/147 |
| 2018/0162389 A1* | 6/2018 | Minemura | B60W 50/029 |
| 2019/0135282 A1 | 5/2019 | Sakaguchi | |
| 2019/0242983 A1* | 8/2019 | Yokota | G01S 7/4815 |
| 2020/0110684 A1* | 4/2020 | Hu | H04L 9/0643 |
| 2020/0409387 A1* | 12/2020 | Tsurumi | G05D 1/0238 |
| 2021/0016735 A1* | 1/2021 | Radetzki | G08G 1/163 |
| 2021/0291836 A1* | 9/2021 | Cho | B60W 30/18054 |
| 2022/0097699 A1 | 3/2022 | Sakaguchi | |
| 2022/0368860 A1* | 11/2022 | Shinohara | G06V 20/56 |

FOREIGN PATENT DOCUMENTS

| | | | |
|---|---|---|---|
| JP | 3330624 B2 * | 9/2002 | |
| JP | 2006-259895 A | 9/2006 | |
| JP | 2010-250652 A | 11/2010 | |
| JP | 2019-084924 A | 6/2019 | |

\* cited by examiner

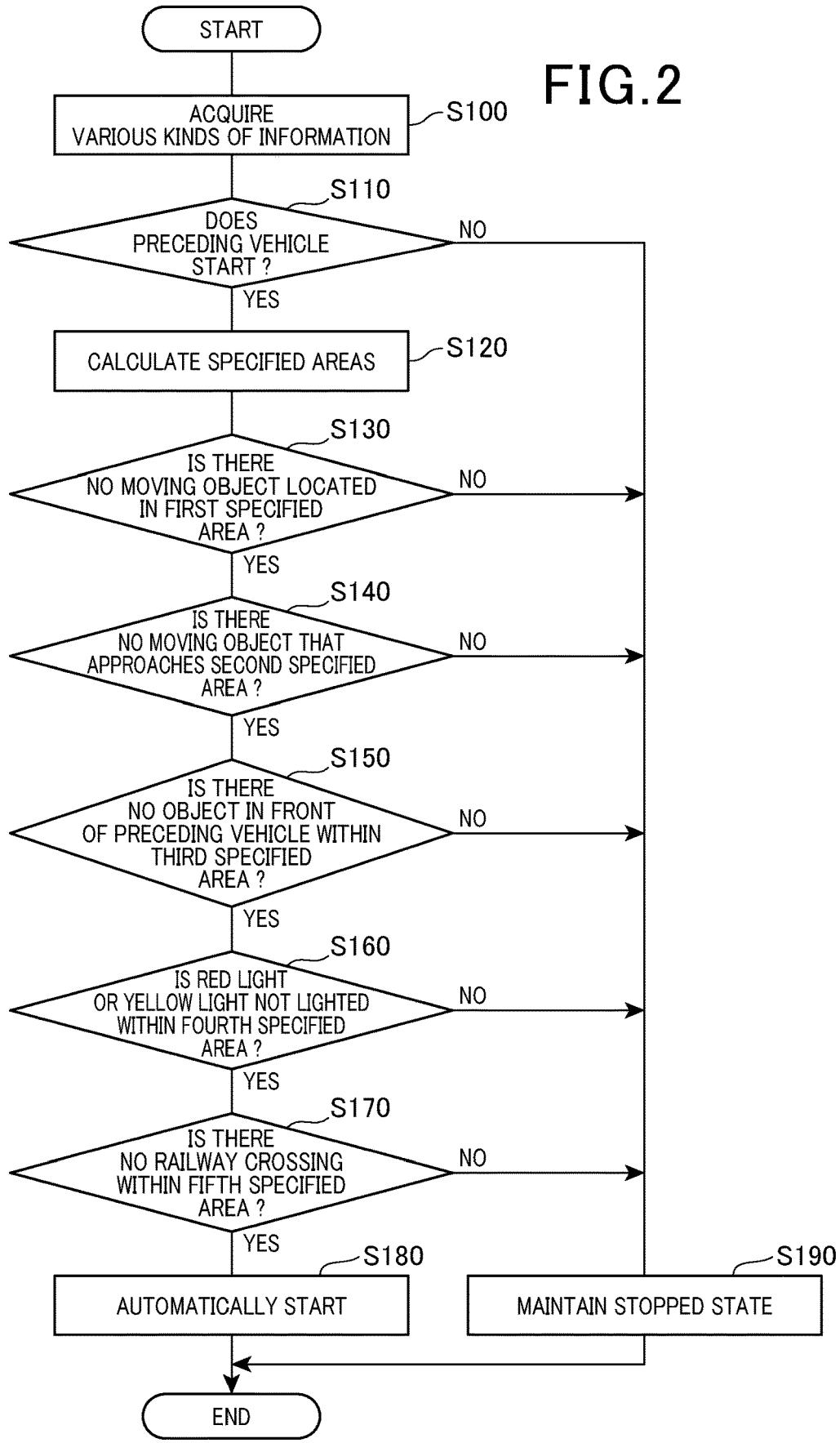

DRIVING ASSISTANCE DEVICE AND DRIVING ASSISTANCE METHOD

CROSS-REFERENCE TO RELATED APPLICATION

This application is a continuation application of International Application No. PCT/JP2020/045262 filed Dec. 4, 2020 which designated the U.S. and claims priority to Japanese Patent Application No. 2019-227097 filed Dec. 17, 2019, the contents of each of which are incorporated herein by reference.

BACKGROUND

Technical Field

The present disclosure relates to a driving assistance device and a driving assistance method.

Related Art

A driving assistance device that supports starting of a vehicle is known.

BRIEF DESCRIPTION OF THE DRAWINGS

In the accompanying drawings:

FIG. 2 is a flowchart illustrating processing of the driving assistance device;

DESCRIPTION OF SPECIFIC EMBODIMENTS

Figure 1A:
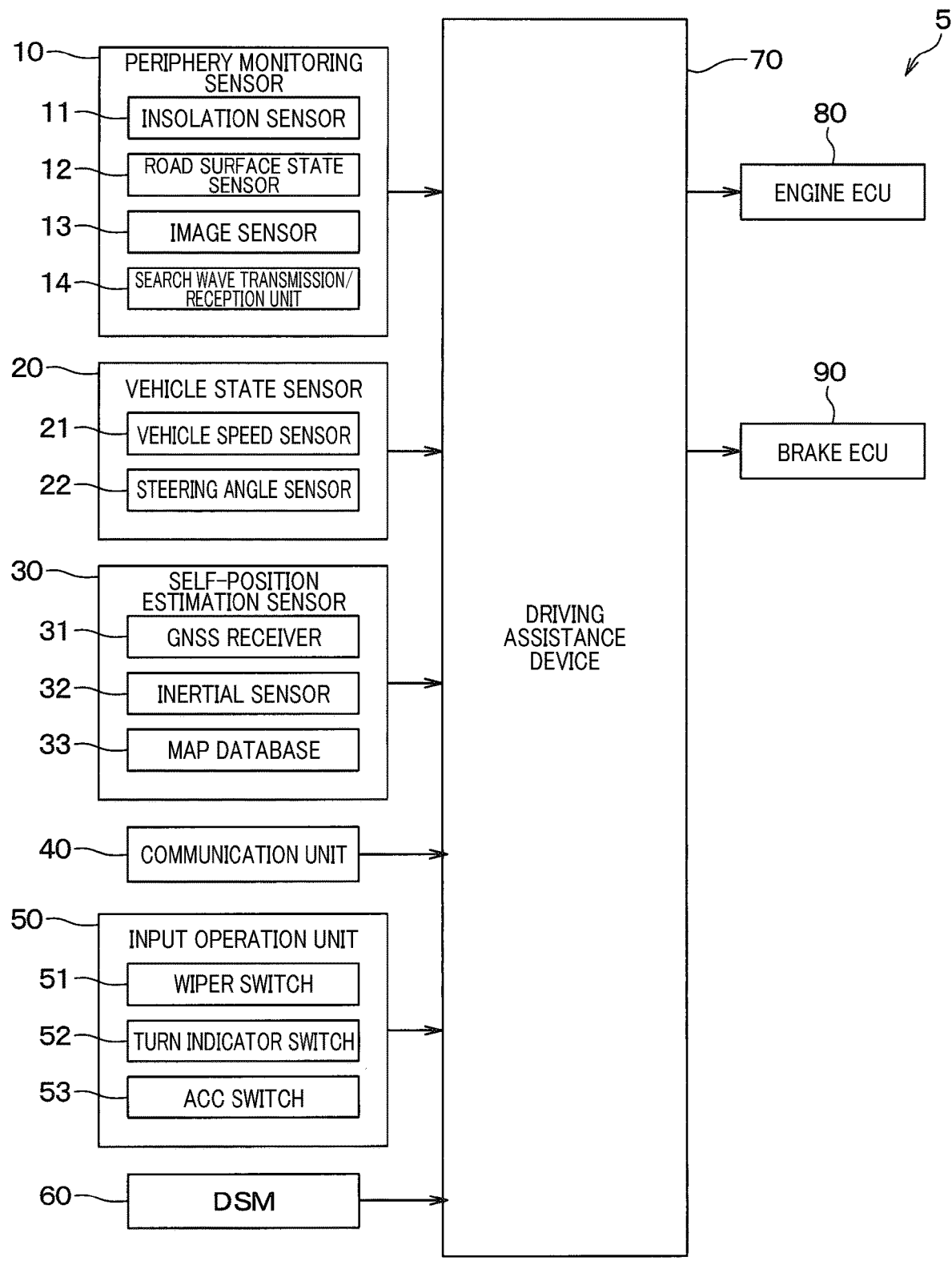
FIG. 1A is a configuration diagram of an in-vehicle system in which a driving assistance device of embodiments is used.

According to research by the inventors regarding the above known driving assistance device as described in JP 2010-250652 A, in a case where a vehicle automatically starts in accordance with starting of a preceding vehicle, there is a possibility that the vehicle may collide with an object due to change of an environment around the vehicle such as a pedestrian crossing in front of the vehicle.

In view of the above, it is desired to have a driving assistance device and a driving assistance method that enable avoidance of collision between a vehicle and an object.

One aspect of the present disclosure provides a driving assistance device includes a determination unit configured to in a case where a preceding vehicle located in front of a vehicle in a stopped state starts, determine whether an object is located inside a specified area that is a predetermined area in front of the vehicle, and a driving assistance unit configured to maintain the stopped state of the vehicle in a case where an object is located inside the specified area in a case where the preceding vehicle starts.

Another aspect provides a driving assistance method including: in a case where a preceding vehicle located in front of a vehicle in a stopped state starts, determining whether an object is located inside a specified area that is a predetermined area in front of the vehicle, and maintaining the stopped state of the vehicle in a case where an object is located inside the specified area in a case where the preceding vehicle starts.

This can avoid collision between the vehicle and the object.

Embodiments will be described below with reference to the drawings. Note that in the following respective embodiments, the same reference numerals will be assigned to portions that are the same as or equal to each other, and description thereof will be omitted.

A driving assistance device 70 of the present embodiment is applied to an in-vehicle system 5 of a vehicle 1 and supports starting of the vehicle 1. First, the in-vehicle system 5 will be described.

As illustrated in FIG. 1A, the in-vehicle system 5 includes a surroundings monitoring sensor 10, a vehicle state sensor 20, a self-position estimation sensor 30, a communication unit 40, an input operation unit 50, a DSM 60, a driving assistance device 70, an engine ECU 80, and a brake ECU 90. Note that the DSM is an abbreviation of a driver status monitor.

The surroundings monitoring sensor 10 outputs a signal in accordance with an environment around the vehicle 1 to the driving assistance device 70 which will be described later. Specifically, the surroundings monitoring sensor 10 includes an insolation sensor 11, a road surface state sensor 12, an image sensor 13 and a search wave transmission/reception unit 14.

The insolation sensor 11 outputs a signal in accordance with an amount of insolation Ms from outside of the vehicle 1 to the driving assistance device 70.

The road surface state sensor 12 acquires a road surface image using a camera, a magnitude of vibration of tires of the vehicle 1, angles of incidence and reflection of near-infrared light radiated on a road surface on which the vehicle 1 is located, and the like. The road surface state sensor 12 then outputs a signal in accordance with a road surface state of the road on which the vehicle 1 is located to the driving assistance device 70 based on these kinds of information.

The image sensor 13 includes cameras and captures images in front, behind and side of the vehicle 1. Further, the image sensor 13 outputs the captured camera images to the driving assistance device 70 and outputs information such as a type of an obstacle around the vehicle 1 to the driving assistance device 70 based on the captured images.

The search wave transmission/reception unit 14 transmits a search wave such as a millimeter wave, a sonar and infrared light to an object in front of the vehicle 1. Further, the search wave transmission/reception unit 14 receives a search wave reflected from this object. Then, the search wave transmission/reception unit 14 outputs a signal in accordance with relative speed and a relative position of the object in front of the vehicle 1 to the driving assistance device 70 based on information obtained from this search wave.

The vehicle state sensor 20 outputs a signal in accordance with a traveling state of the vehicle 1 to the driving assistance device 70. Specifically, the vehicle state sensor 20 includes a vehicle speed sensor 21 and a steering angle sensor 22.

The vehicle speed sensor 21 outputs a signal in accordance with speed of the vehicle 1 to the driving assistance device 70.

The steering angle sensor 22 outputs a signal in accordance with a steering angle $\theta c$ by steering operation of the vehicle 1 to the driving assistance device 70.

The self-position estimation sensor 30 outputs information regarding a position, and the like, of the vehicle 1 to the driving assistance device 70. Specifically, the self-position estimation sensor 30 includes a GNSS receiver 31, an inertial sensor 32, and a map database 33.

The GNSS receiver 31, which is a GPS receiver, or the like, receives positioning signals from a plurality of satellites. The inertial sensor 32 includes, for example, a gyro sensor and an acceleration sensor and detects inertial force generated at the vehicle 1. Then, the self-position estimation sensor 30 outputs a signal in accordance with a position of the vehicle 1 to the driving assistance device 70 based on the positioning signals received at the GNSS receiver 31 and a detection result by the inertial sensor 32.

The map database 33, which is a non-volatile memory, stores map information such as link data, node data and road shape data as a high-accuracy map. Further, the road shape data includes data such as altitude, a transverse gradient, a longitudinal gradient and the number of lanes. Further, the data such as the altitude, the transverse gradient, the longitudinal gradient and the number of lanes is provided at least for each of spots on the road, for example, for each of observation points of the map data.

Figure 8:
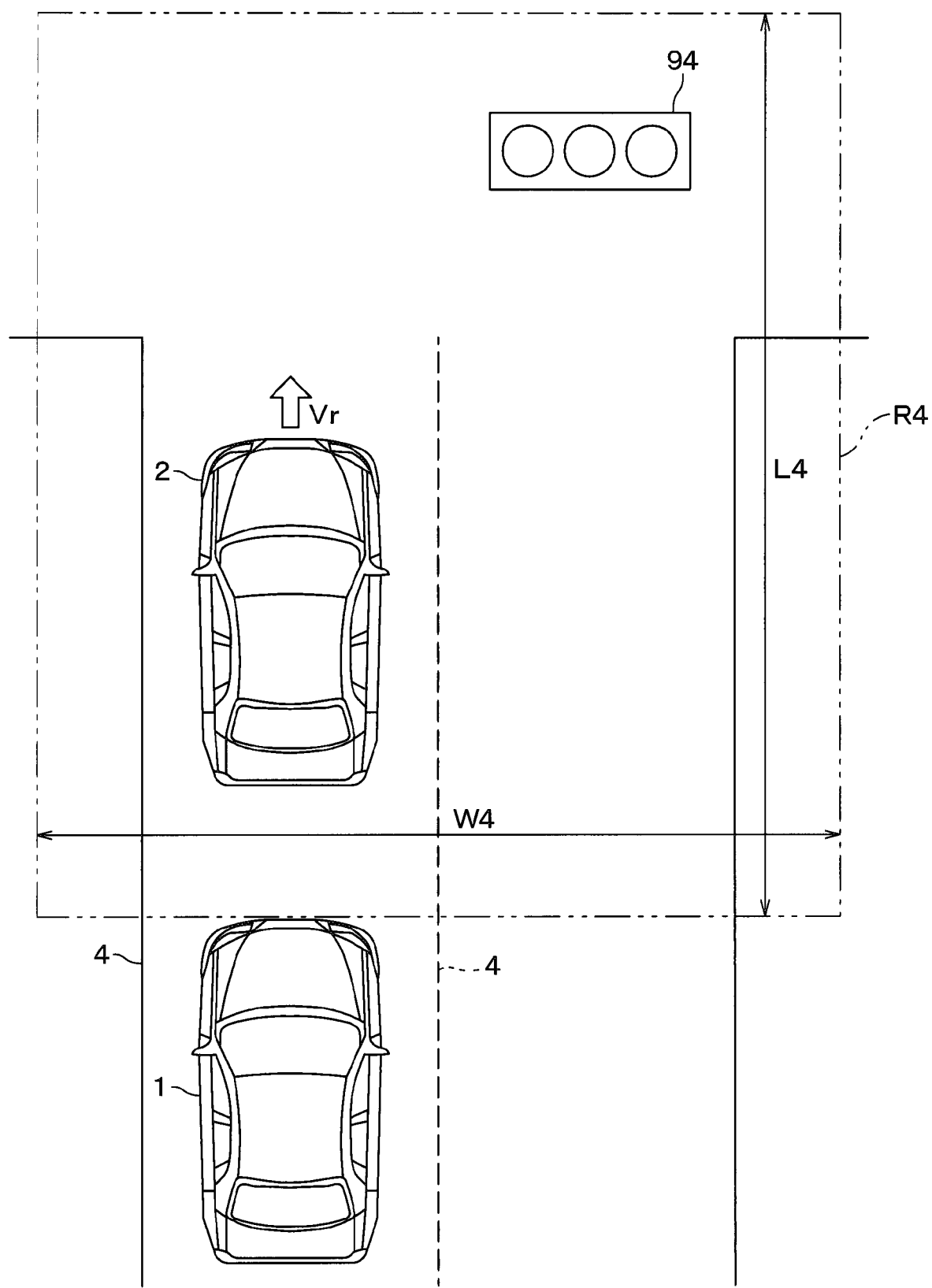
FIG. 8 is a view when a traffic light is located within the specified area.
Figure 9:
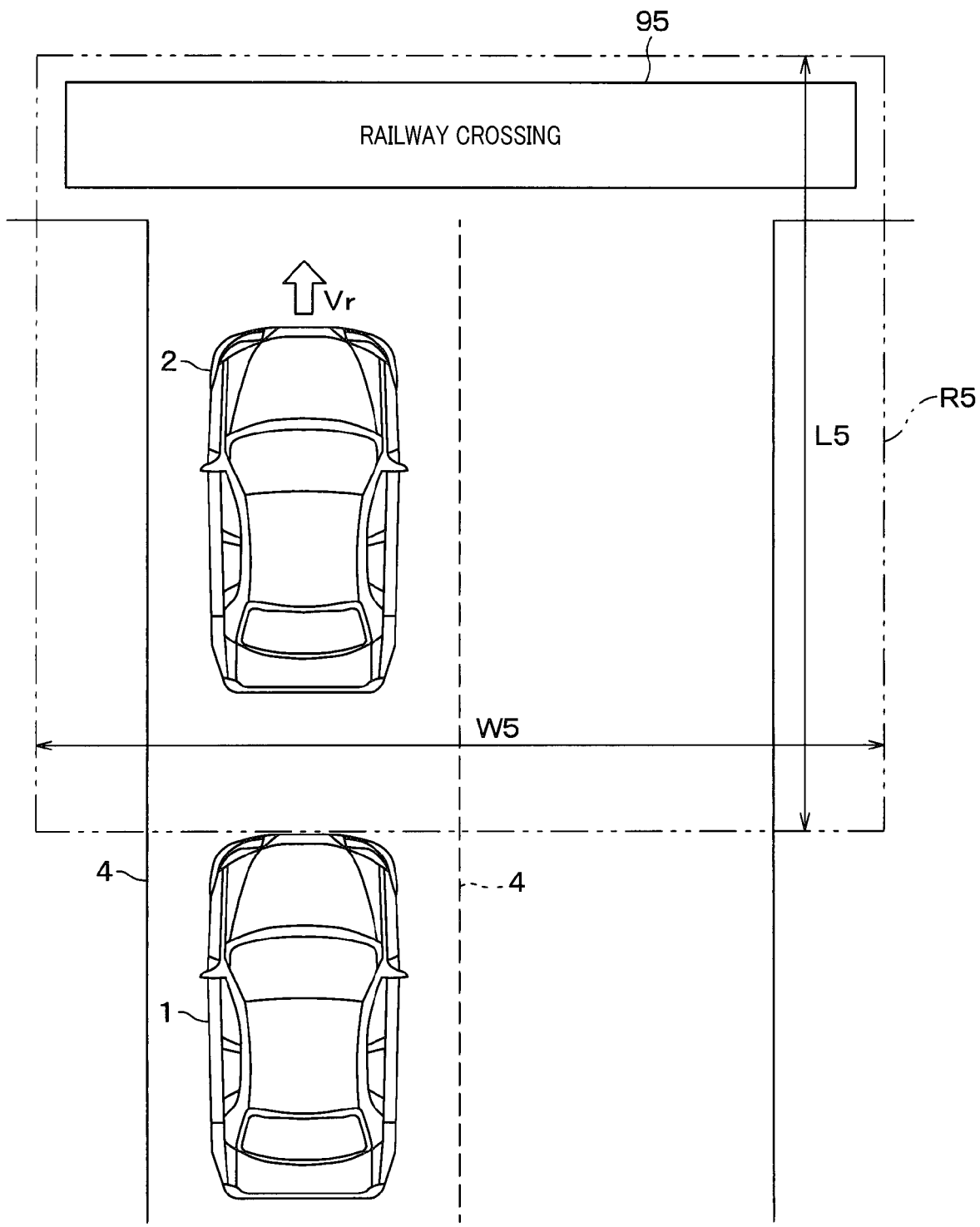
FIG. 9 is a view when a railway crossing is located within the specified area.

The communication unit 40 receives infrastructure information from infrastructure devices disposed on the road. This infrastructure information includes, for example, position information of a traffic light 94 as illustrated in FIG. 8, position information of a railway crossing 95 as illustrated in FIG. 9, traffic light cycle information, railway crossing information, and the like. The traffic light cycle information includes, for example, information regarding respective lighting periods of a green light, a yellow light and a red light, information regarding a lighting period of an arrow light indicating a right turn, or the like, information regarding a light that is currently lit and an elapsed period since the light has been lit, and the like. Further, the railway crossing information includes, for example, information regarding how many more seconds are required for a crossing gate of the railway crossing 95 to open, and the like. Further, here, the communication unit 40 receives other vehicle information which is information such as an accelerator operation state, a brake operation state, speed, acceleration, and the like, of another vehicle by performing inter-vehicle communication with another vehicle located around the vehicle 1. The communication unit 40 then outputs the received infrastructure information and other vehicle information to the driving assistance device 70.

The input operation unit 50 outputs signals indicating respective operation settings to the driving assistance device 70 by being operated by a driver of the vehicle 1. Specifically, the input operation unit 50 includes a wiper switch 51, a turn indicator switch 52 and an ACC switch 53.

The wiper switch 51 drives a wiper (not illustrated) of the vehicle 1 by ON/OFF operation by the driver of the vehicle 1.

The turn indicator switch 52 turns on a right/left turn indicator (not illustrated) of the vehicle 1 by ON/OFF operation by the driver of the vehicle 1.

The ACC switch 53 causes a program of the driving assistance device 70 which will be described later to be executed by ON/OFF operation by the driver of the vehicle 1. Note that ACC is an abbreviation of adaptive cruise control.

The DSM 60 is a device that estimates a state of the driver of the vehicle 1. The DSM 60 includes, for example, a camera and captures an image of the face of the driver of the vehicle 1. Then, the DSM 60 outputs the image of the face to the driving assistance device 70 and outputs information regarding a state of the driver such as a line of sight of the driver in the vehicle 1 to the driving assistance device 70 based on this image of the face.

The driving assistance device 70 is mainly configured as a microcomputer, and the like, and includes a CPU, a ROM, a RAM, a flash memory, an I/O unit, a bus line that connects these components, and the like. Further, the driving assistance device 70 outputs a command signal to the engine ECU 80 and the brake ECU 90 which will be described later when a program stored in the ROM of the driving assistance device 70 is executed.

Figure 1B:
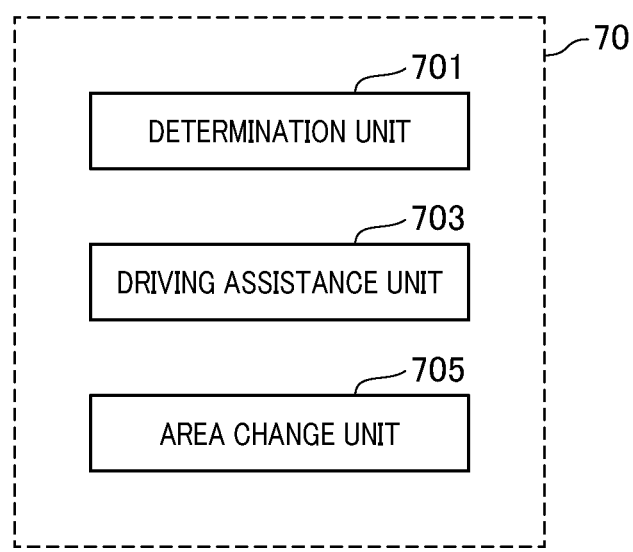
FIG. 1B is a functional block diagram of the driving assistance device.

As illustrated in FIG. 1B, the driving assistance device 70 includes, as functional blocks, a determination unit 701, a driving assistance unit 703, and an area change unit 705. The functions of the functional blocks 701-705 may be implemented by the CPU executing the program. In the process described later, the determination unit 701 is responsible for execution of the process steps S130, S140, and S150, the driving assistance unit 703 is responsible for execution of the process steps S160, S170, S180, and S190, and the area change unit 705 is responsible for execution of the process steps S120.

The engine ECU 80 is mainly constituted with a microcomputer, and the like, and includes a CPU, a ROM, a RAM, a flash memory, an I/O unit, a bus line that connects these components, and the like. Further, the engine ECU 80 controls an engine (not illustrated) of the vehicle 1 based on a signal from the driving assistance device 70 when a program stored in the ROM of the engine ECU 80 is executed.

The brake ECU 90 is mainly constituted with a microcomputer, and the like, and includes a CPU, a ROM, a RAM, a flash memory, an I/O unit, a bus line that connects these components, and the like. Further, the brake ECU 90 controls a brake system (not illustrated) of the vehicle 1 based on a signal from the driving assistance device 70 when a program stored in the ROM of the brake ECU 90 is executed.

The in-vehicle system 5 is constituted as described above. Here, the vehicle 1 automatically starts in accordance with starting of the preceding vehicle 2 that is stopped in front of the vehicle 1 through processing of the driving assistance device 70 of the in-vehicle system 5.

Processing of the driving assistance device 70 will be described next with reference to the flowchart in FIG. 2. Here, in a case where the ACC switch 53 is in an ON state, a shift range of the vehicle 1 is a D range, the vehicle 1 is stopped and the stopped preceding vehicle 2 is detected, the driving assistance device 70 executes the program stored in the ROM of the driving assistance device 70. Note that in detection of the preceding vehicle 2, for example, another vehicle located within a predetermined area in front of the vehicle 1 is detected by the surroundings monitoring sensor 10.

In step S100, the driving assistance device 70 acquires various kinds of information from the surroundings monitoring sensor 10, the vehicle state sensor 20, the self-position estimation sensor 30, the communication unit 40, the input operation unit 50 and the DSM 60. For example, the driving assistance device 70 acquires a relative position and relative speed Vr of the preceding vehicle 2 with respect to the vehicle 1 and a relative position and relative speed of an object different from the preceding vehicle 2 from the search wave transmission/reception unit 14. Further, the driving assistance device 70 acquires a camera image captured by the image sensor 13 from the image sensor 13. Still further, the driving assistance device 70 acquires a state such as a line of sight of the driver of the vehicle 1 from the DSM 60. Yet further, the driving assistance device 70 acquires an amount of insolation Ms from outside of the vehicle 1 from the insolation sensor 11. Further, the driving assistance device 70 acquires a road surface state of the road on which the vehicle 1 is located from the road surface state sensor 12. Still further, the driving assistance device 70 acquires the steering angle θc of the vehicle 1 from the steering angle sensor 22. Yet further, the driving assistance device 70 acquires road information of the road on which the vehicle 1 is located from the self-position estimation sensor 30. Further, the driving assistance device 70 acquires the ON/OFF state of the wiper switch 51 and the ON/OFF state of the turn indicator switch 52 from the input operation unit 50.

Figure 3:
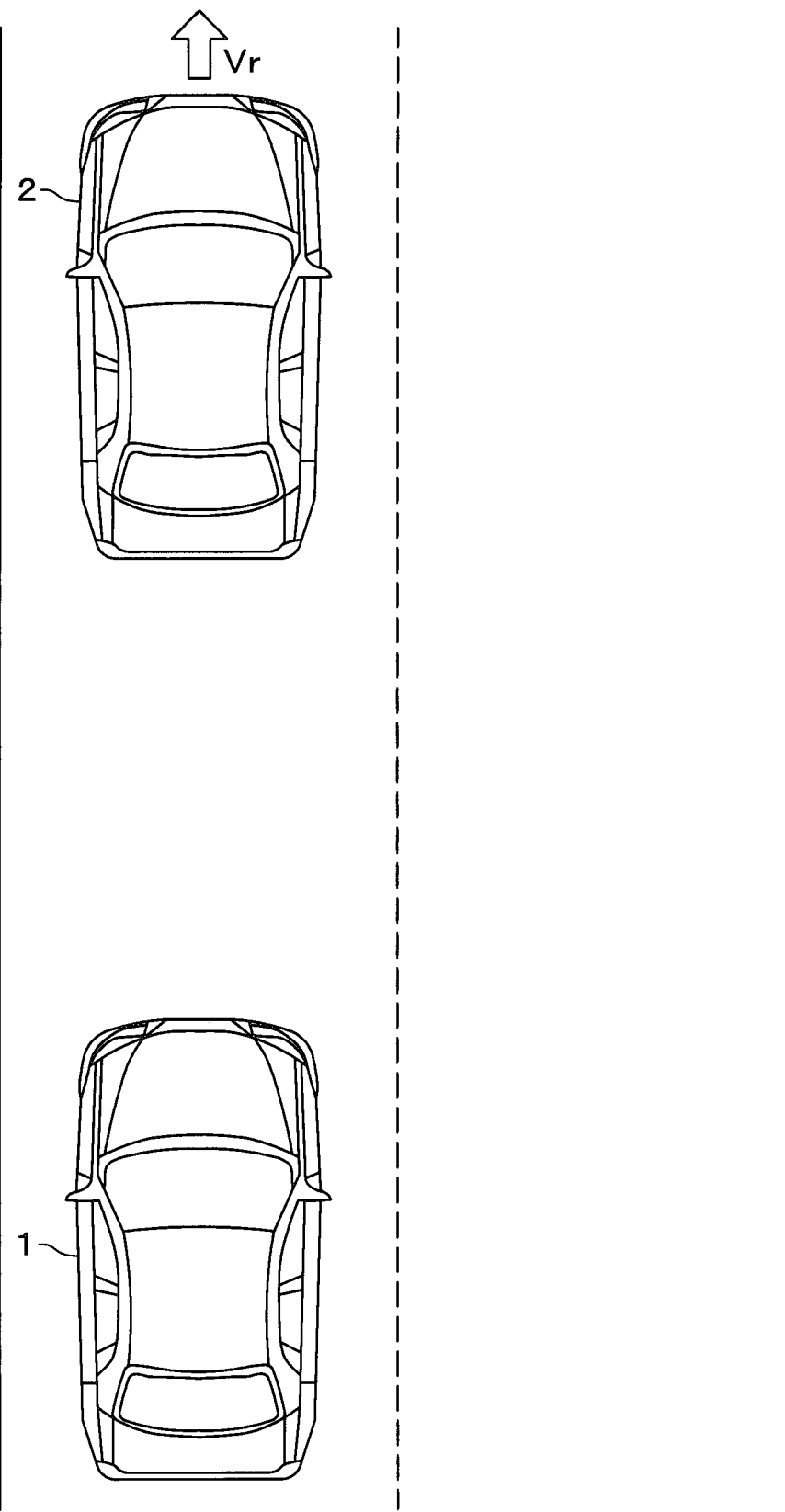
FIG. 3 is a view illustrating starting of a preceding vehicle.

Subsequently, in step S110, the driving assistance device 70 determines whether the preceding vehicle 2 in a stopped state starts. For example, here, the driving assistance device 70 determines whether the preceding vehicle 2 located in front of the vehicle 1 starts, based on change of the relative speed Vr of the preceding vehicle 2 with respect to the vehicle 1 acquired in step S100. Here, both the vehicle 1 and the preceding vehicle 2 are stopped, and thus, the relative speed Vr of the preceding vehicle 2 with respect to the vehicle 1 is zero. Thus, the driving assistance device 70 determines that the preceding vehicle 2 starts as illustrated in FIG. 3 when the relative speed Vr of the preceding vehicle 2 with respect to the vehicle 1 changes from zero. Thereafter, the processing transitions to step S120. Further, the driving assistance device 70 determines that the preceding vehicle 2 does not start when the relative speed Vr of the preceding vehicle 2 with respect to the vehicle 1 does not change from zero. Thereafter, the processing transitions to step S190.

Subsequently, in step S120, the driving assistance device 70 calculates a first specified area R1, a second specified area R2, a third specified area R3, a fourth specified area R4 and a fifth specified area R5 to be used in processing which will be described later. The first specified area R1, the second specified area R2, the third specified area R3, the fourth specified area R4 and the fifth specified area R5 are predetermined areas indicated by a distance in front of the vehicle 1 from a front end of the vehicle 1 and a distance in a width direction of the vehicle 1. These first specified area R1, second specified area R2, third specified area R3, fourth specified area R4 and fifth specified area R5 will be described in detail later. Further, here, the driving assistance device 70 changes respective sizes of the calculated specified areas R1, R2, R3, R4 and R5 based on the line of sight of the driver of the vehicle 1, the weather, the road surface state of the road on which the vehicle 1 is located and the road information thereof. Further, the driving assistance device 70 changes respective shapes of the calculated specified areas R1, R2, R3, R4 and R5 based on the steering angle θc and the ON/OFF state of the turn indicator switch 52. Change of the sizes and the shapes of the specified areas R1, R2, R3, R4 and R5 by the driving assistance device 70 will also be described in detail later.

Figure 4:
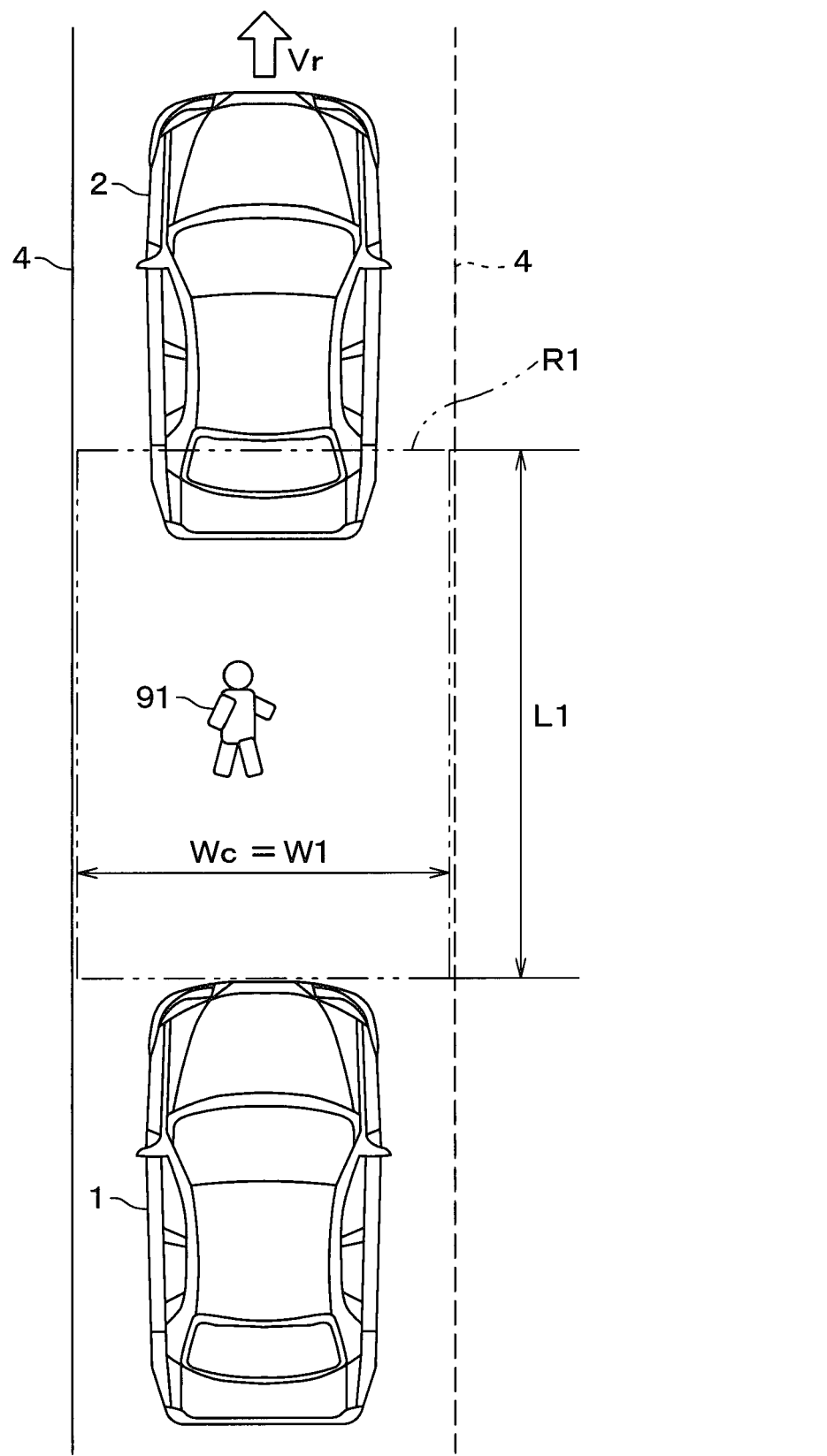
FIG. 4 is a view when an object is located within a specified area.

The preceding vehicle 2 starts in step S130 subsequent to step S120, and thus, the driving assistance device 70 determines whether a first moving object 91 is located within the first specified area R1 to determine whether the vehicle 1 can automatically start to follow the preceding vehicle 2. Here, the first moving object 91 is a moving object different from the preceding vehicle 2. Further, here, as illustrated in FIG. 4, a first width W1 that is a width of the first specified area R1 is calculated by the driving assistance device 70 so as to be, for example, a lane width We that is a width between lanes 4 of the road on which the vehicle 1 is located. Still further, a first length L1 that is a length of the first specified area R1 is calculated by the driving assistance device 70 so as to be, for example, a distance required for the vehicle 1 to be stopped since the driver of the vehicle 1 has stepped on a brake pedal after the vehicle 1 had automatically started, and is approximately 15 m. Further, the first specified area R1 is an area of a rectangle sectioned and formed by the first width W1 and the first length L1. Still further, here, a center of a side on the vehicle 1 side of the first specified area R1 matches a center of the front end of the vehicle 1. Note that FIG. 4 indicates the first specified area R1 with a dashed-two dotted line.

Further, for example, here, the driving assistance device 70 determines whether the first moving object 91 is located within the first specified area R1 based on the relative position of the first moving object 91 acquired in step S100. Specifically, it is assumed that a distance in front of the vehicle 1 from the front end of the vehicle 1 to a rear end of the first moving object 91 is equal to or less than the first length L1 and a distance in the width direction of the vehicle 1 from the center of the front end of the vehicle 1 to the first moving object 91 is equal to or less than half the first width W1. In this event, the first moving object 91 is located within the first specified area R1, and thus, the processing transitions to step S190. Either a case where the distance in front of the vehicle 1 from the front end of the vehicle 1 to the rear end of the first moving object 91 is longer than the first length L1 or a case where the distance in the width direction of the vehicle 1 from the center of the front end of the vehicle 1 to the first moving object 91 is longer than half the first width W1 will be assumed. In this event, the first moving object 91 is not located within the first specified area R1, and thus, the processing transitions to step S140. Note that here, it is assumed that an object is located within the specified area even in a case where only part of the object is located within the specified area.

Figure 5:
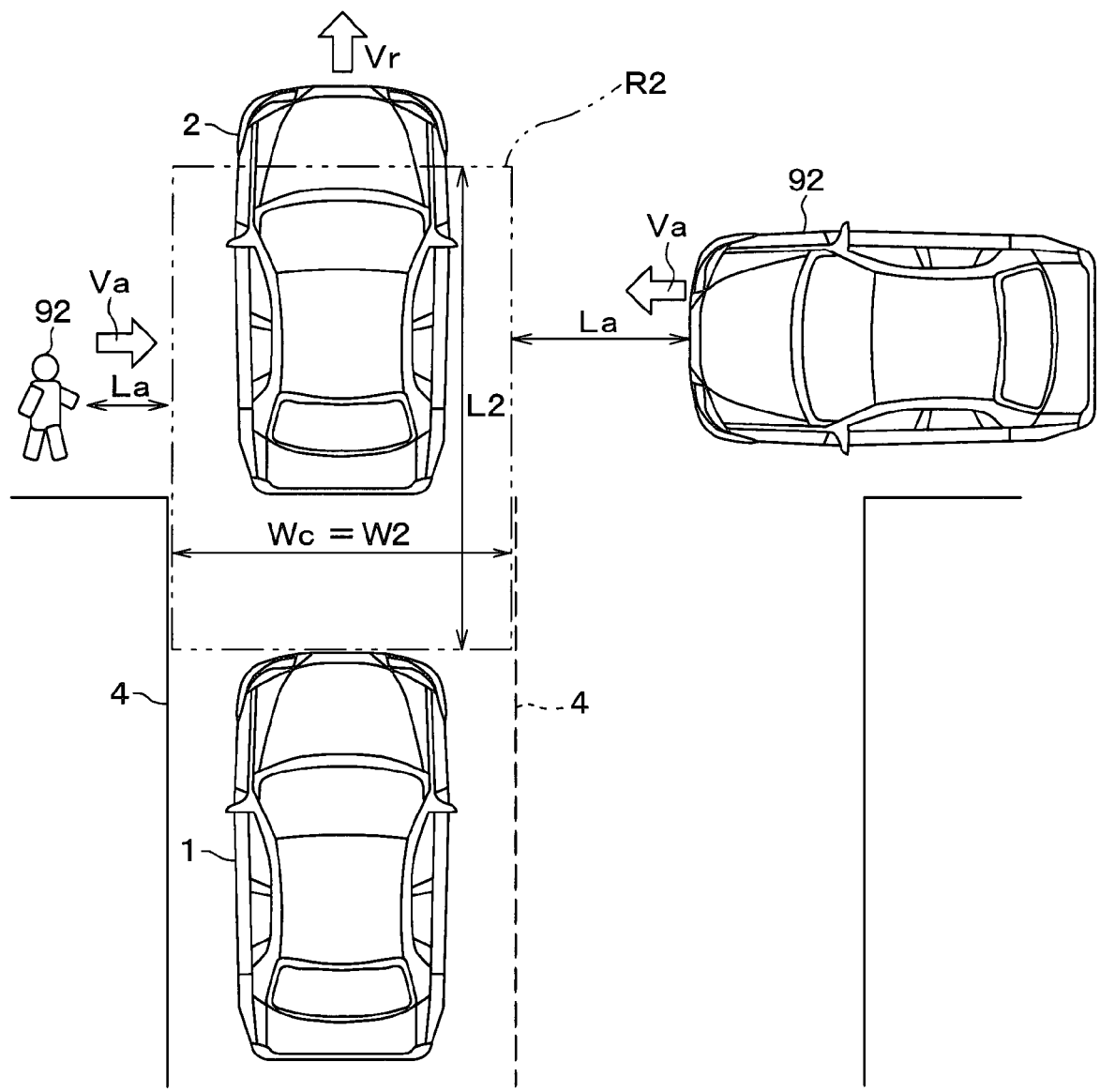
FIG. 5 is a view when an object approaches the specified area.
Figure 6:
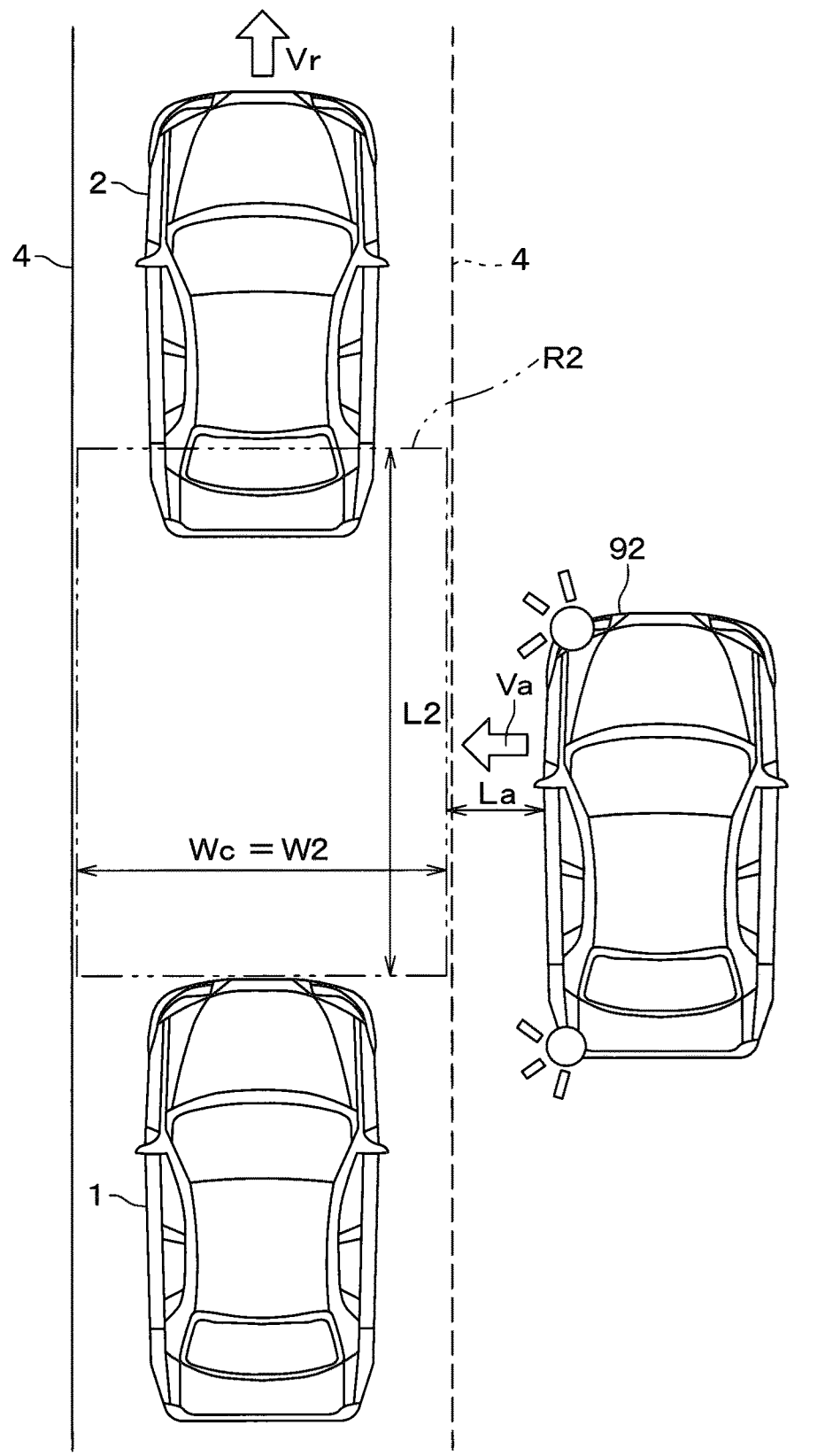
FIG. 6 is a view when an object approaches the specified area.

In step S140 subsequent to step S130, the driving assistance device 70 determines whether a second moving object 92 approaches the second specified area R2. Here, the second moving object 92 is an object different from the preceding vehicle 2 and is located outside the second specified area R2. Further, as illustrated in FIG. 5 and FIG. 6, a second width W2 that is a width of the second specified area R2 is calculated by the driving assistance device 70 so as to be, for example, a lane width We in a similar manner to the width of the first specified area R1. Still further, a second length L2 that is a length of the second specified area R2 is calculated by the driving assistance device 70 so as to be equal to or less than the first length L1 and is, for example, approximately 10 to 15 m. Then, the second specified area R2 is an area of a rectangle sectioned and formed by the second width W2 and the second length L2. Further, here, a center of the side on the vehicle 1 side of the second specified area R2 matches the center of the front end of the vehicle 1. Note that FIG. 5 and FIG. 6 indicate the second specified area R2 with a dashed-two dotted line.

Then, for example, the driving assistance device 70 determines whether the second moving object 92 approaches the second specified area R2 based on the relative position and the relative speed of the second moving object 92 acquired in step S100. Specifically, the driving assistance device 70 calculates an approach distance La based on the position of the second specified area R2 and the relative position of the second moving object 92 acquired in step S100. Here, the approach distance La is a distance from the second moving object 92 to an end of the second specified area R2 in a direction in which the second moving object 92 is headed to the second specified area R2. Further, the driving assistance device 70 calculates approach speed Va that is speed at which the second moving object 92 is headed to the second specified area R2 based on the relative speed of the second moving object 92 acquired in step S100. By this means, the driving assistance device 70 calculates TTC_R that is time to collision between the second moving object 92 and the second specified area R2 by dividing the approach distance La by the approach speed Va as indicated in the following relational expression (1). Further, in a case where the calculated TTC_R is equal to or greater than a threshold, time to contact between the second moving object 92 and the second specified area R2 is relatively long, and thus, the driving assistance device 70 determines that the second moving object 92 does not approach the second specified area R2. Thereafter, the processing transitions to step S150. Further, in a case where the calculated TTC_R is less than the threshold, time to contact between the second moving object 92 and the second specified area R2 is relatively short, and thus, the driving assistance device 70 determines that the second moving object 92 approaches the second specified area R2. Thereafter, the processing transitions to step S190. Note that the threshold regarding TTC_R is set in accordance with, for example, a type of the second moving object 92, specifically, whether the second moving object 92 is a person, another vehicle, or the like. Further, in a case where the second moving object 92 is not detected, the processing transitions to step S150.

$$TTC\_R = La/Va \tag{1}$$

Figure 7:
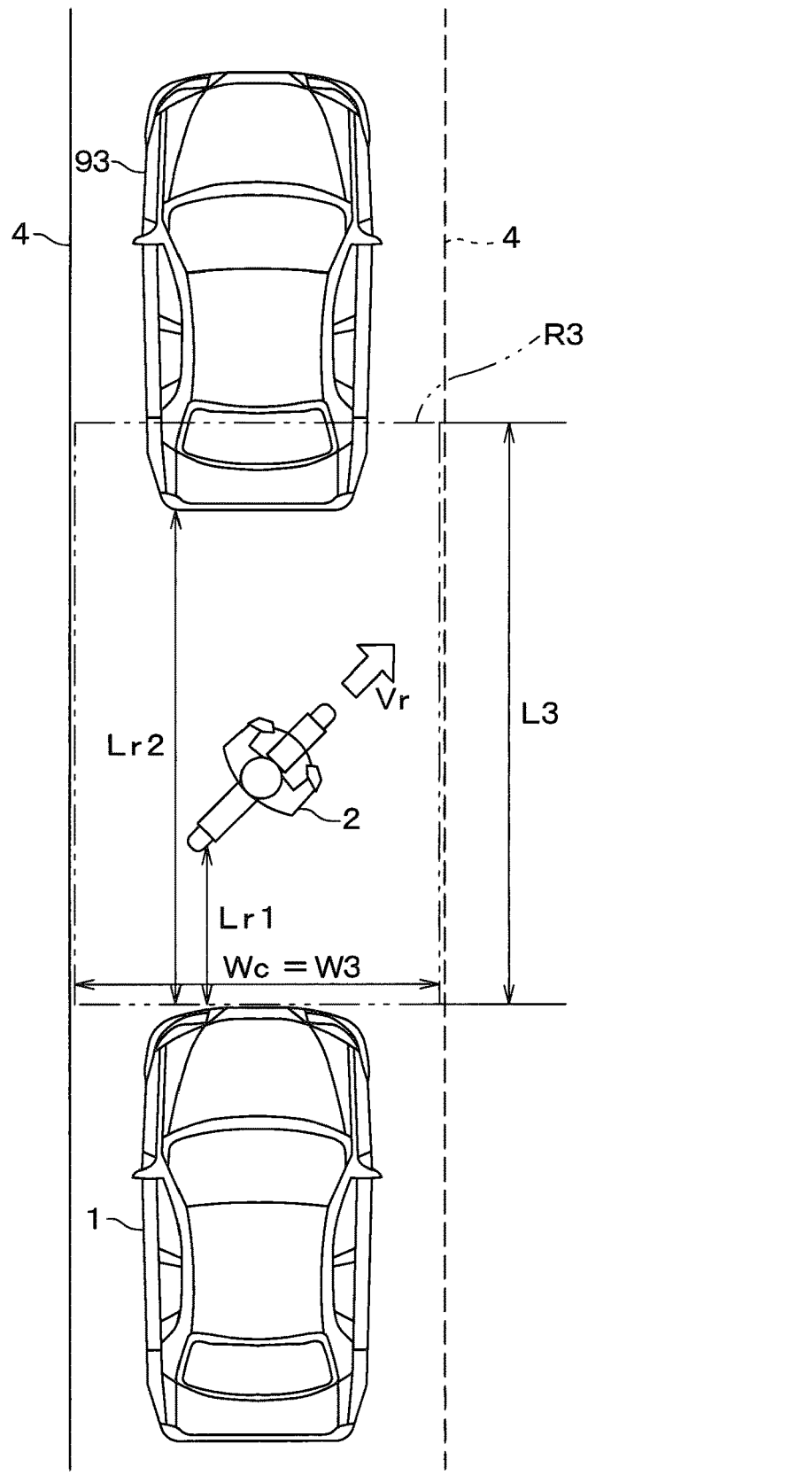
FIG. 7 is a view when an object is located within the specified area.

In step S150 subsequent to step S140, the driving assistance device 70 determines whether a stationary object 93 is located in front of the preceding vehicle 2 within the third specified area R3. Here, as illustrated in FIG. 7, a third width W3 that is a width of the third specified area R3 is calculated by the driving assistance device 70 so as to be the lane width We in a similar manner to the widths of the first specified area R1 and the second specified area R2. Further, a third length L3 that is a length of the third specified area R3 is calculated by the driving assistance device 70 so as to be, for example, a length equal to or longer than the first length L1 and is approximately 20 m. Further, here, a center of a side on the vehicle 1 side of the third specified area R3 matches the center of the front end of the vehicle 1. Then, the third specified area R3 is an area of a rectangle sectioned and formed by the third width W3 and the third length L3. Note that FIG. 7 indicates the third specified area R3 with a dashed-two dotted line.

Then, for example, here, the driving assistance device 70 determines whether the stationary object 93 is located in front of the preceding vehicle 2 within the third specified area R3 based on the relative position of the preceding vehicle 2 and the relative position of the stationary object 93 acquired in step S100. Specifically, as illustrated in FIG. 7, the driving assistance device 70 calculates a first relative distance Lr1 that is a distance in front of the vehicle 1 from the front end of the vehicle 1 to a rear end of the preceding vehicle 2. Further, the driving assistance device 70 calculates a second relative distance Lr2 that is a distance in front of the vehicle 1 from the front end of the vehicle 1 to a rear end of the stationary object 93. Further, the driving assistance device 70 calculates a distance in the width direction of the vehicle 1 from the center of the front end of the vehicle 1 to the stationary object 93. Then, it is assumed that the second relative distance Lr2 is longer than the first relative distance Lr1 and equal to or less than the third length L3, and the distance in the width direction of the vehicle 1 from the center of the front end of the vehicle 1 to the stationary object 93 is equal to or less than half the third width W3. In this event, the stationary object 93 is located in front of the preceding vehicle 2 within the third specified area R3, and thus, the processing transitions to step S190. Further, either a case where the second relative distance Lr2 is longer than the third length L3 or a case where the distance in the width direction of the vehicle 1 from the center of the front end of the vehicle 1 to the stationary object 93 is longer than half the third width W3 will be assumed. In this case, the stationary object 93 is not located in front of the preceding vehicle 2 within the third specified area R3, and thus, the processing transitions to step S160. Note that in a case where the stationary object 93 is not detected, the processing transitions to step S160. Further, FIG. 7 illustrates a four-wheeled vehicle in a stopped state as the stationary object 93 to facilitate understanding of the situation in FIG. 7. Further, FIG. 7 illustrates a two-wheeled vehicle that starts as the preceding vehicle 2.

In step S160 subsequent to step S150, the driving assistance device 70 determines whether the traffic light 94 is located within the fourth specified area R4. Here, a fourth width W4 that is a width of the fourth specified area R4 is calculated by the driving assistance device 70 so as to be, for example, equal to or greater than a width of the road on which the vehicle 1 is located and is approximately 30 m. Further, a fourth length L4 that is a length of the fourth specified area R4 is calculated by the driving assistance device 70 so as to be, for example, equal to or greater than the width of the road on which the vehicle 1 is located and is approximately 50 m. Still further, the fourth specified area R4 is an area of a rectangle sectioned and formed by the fourth width W4 and the fourth length L4. Note that FIG. 8 indicates the fourth specified area R4 with a dashed-two dotted line.

Then, for example, here, the driving assistance device 70 determines whether the traffic light 94 is located within the fourth specified area R4 based on the camera image of the image sensor 13 acquired in step S100. Specifically, the driving assistance device 70 detects the traffic light 94 in the camera image by comparing an object in the camera image of the image sensor 13 against a template image of the traffic light 94 set in advance. By this means, the driving assistance device 70 estimates a pixel position of the traffic light 94 in the camera image. Note that in a case where the traffic light 94 is not detected in the camera image, the traffic light 94 is not located within the fourth specified area R4, and thus, the processing transitions to step S170.

Further, the driving assistance device 70 transforms the fourth specified area R4 calculated in step S120 into the fourth specified area R4 corresponding to this camera image after estimating the pixel position of the traffic light 94 in the camera image. For example, the driving assistance device 70 transforms coordinates of the fourth specified area R4 in a three-dimensional spatial coordinate system into coordinates of the fourth specified area R4 in a camera coordinate system based on a transform matrix set in advance through an experiment, or the like. Then, in a case where the pixel position of the traffic light 94 in the camera image is located outside the fourth specified area R4 corresponding to the camera image, the traffic light 94 is not located within the fourth specified area R4, and thus, the processing transitions to step S170.

Further, in a case where the pixel position of the traffic light 94 in the camera image is located within the fourth specified area R4 corresponding to the camera image, the driving assistance device 70 determines whether a green light of the traffic light 94 within the fourth specified area R4 is lit. Specifically, the driving assistance device 70 determines whether the green light of the traffic light 94 within the fourth specified area R4 is lit based on an RGB value of luminance of the traffic light 94 in the camera image. In a case where the green light of the traffic light 94 within the fourth specified area R4 is lit, the processing transitions to step S170. Further, in a case where the green light of the traffic light 94 within the fourth specified area R4 is not lit, that is, a red light or a yellow light is lit, the processing transitions to step S190.

In step S170 subsequent to step S160, the driving assistance device 70 determines whether the railway crossing 95 is located within the fifth specified area R5. Here, a fifth width W5 that is a width of the fifth specified are R5 is calculated by the driving assistance device 70 so as to be, for example, a value similar to the fourth width W4 and is approximately 30 m. Further, a fifth length L5 that is a length of the fifth specified area R5 is calculated by the driving assistance device 70 so as to be, for example, shorter than the fourth length L4 and is approximately 10 m. Note that FIG. 9 indicates the fifth specified area R5 with a dashed-two dotted line.

Then, for example, here, the driving assistance device 70 determines whether the railway crossing 95 is located within the fifth specified area R5 based on the camera image of the image sensor 13 acquired in step S100. Specifically, the driving assistance device 70 detects a railway crossing 95 in the camera image by comparing the object within the camera image of the image sensor 13 against a template image of the railway crossing 95 set in advance. By this means, the driving assistance device 70 estimates a pixel position of the railway crossing 95 in the camera image. Note that in a case where a railway crossing 95 is not detected in the camera image, no railway crossing 95 is located within the fifth specified area R5, and thus, the processing transitions to step S180.

Further, the driving assistance device 70 transforms the fifth specified area R5 calculated in step S120 into the fifth specified area R5 corresponding to the camera image after estimating the pixel position of the railway crossing 95 in the camera image. For example, in a similar manner to the above, the driving assistance device 70 transforms coordinates of the fifth specified area R5 in the three-dimensional spatial coordinate system into coordinates of the fifth specified area R5 in the camera coordinate system based on a transform matrix set in advance through an experiment, or the like. Then, in a case where the pixel position of the railway crossing 95 in the camera image is located outside the fifth specified area R5 corresponding to the camera image, the railway crossing 95 is not located within the fifth specified area R5, and thus, the processing transitions to step S180. Further, in a case where the pixel position of the railway crossing 95 in the camera image is located within the fifth specified area R5 corresponding to the camera image, the processing transitions to step S190.

In step S180 subsequent to step S170, the vehicle 1 is in a state where the vehicle 1 can automatically start relatively safely, and thus, the driving assistance device 70 starts the vehicle 1. Specifically, the driving assistance device 70 outputs a signal for starting the vehicle 1 to the engine ECU 80. This signal causes the engine ECU 80 to drive the engine (not illustrated) of the vehicle 1. As a result of this, the vehicle 1 is accelerated, and thus, automatically starts. Then, the processing is finished.

In step S190, the vehicle 1 is not in a state where the vehicle 1 can automatically start relatively safely, and thus, the driving assistance device 70 maintains the stopped state of the vehicle 1. Specifically, the driving assistance device 70 outputs a signal for stopping the vehicle 1 to the brake ECU 90. This signal causes the brake ECU 90 to control a brake system (not illustrated) of the vehicle 1 to maintain the stopped state of the vehicle 1. Then, the processing is finished.

As a result of the processing of the driving assistance device 70 being performed as described above, the vehicle 1 automatically starts in accordance with starting of the preceding vehicle 2.

Change of the respective sizes and the respective shapes of the specified areas R1, R2, R3, R4 and R5 by the driving assistance device 70 will be described next.

Figure 10:
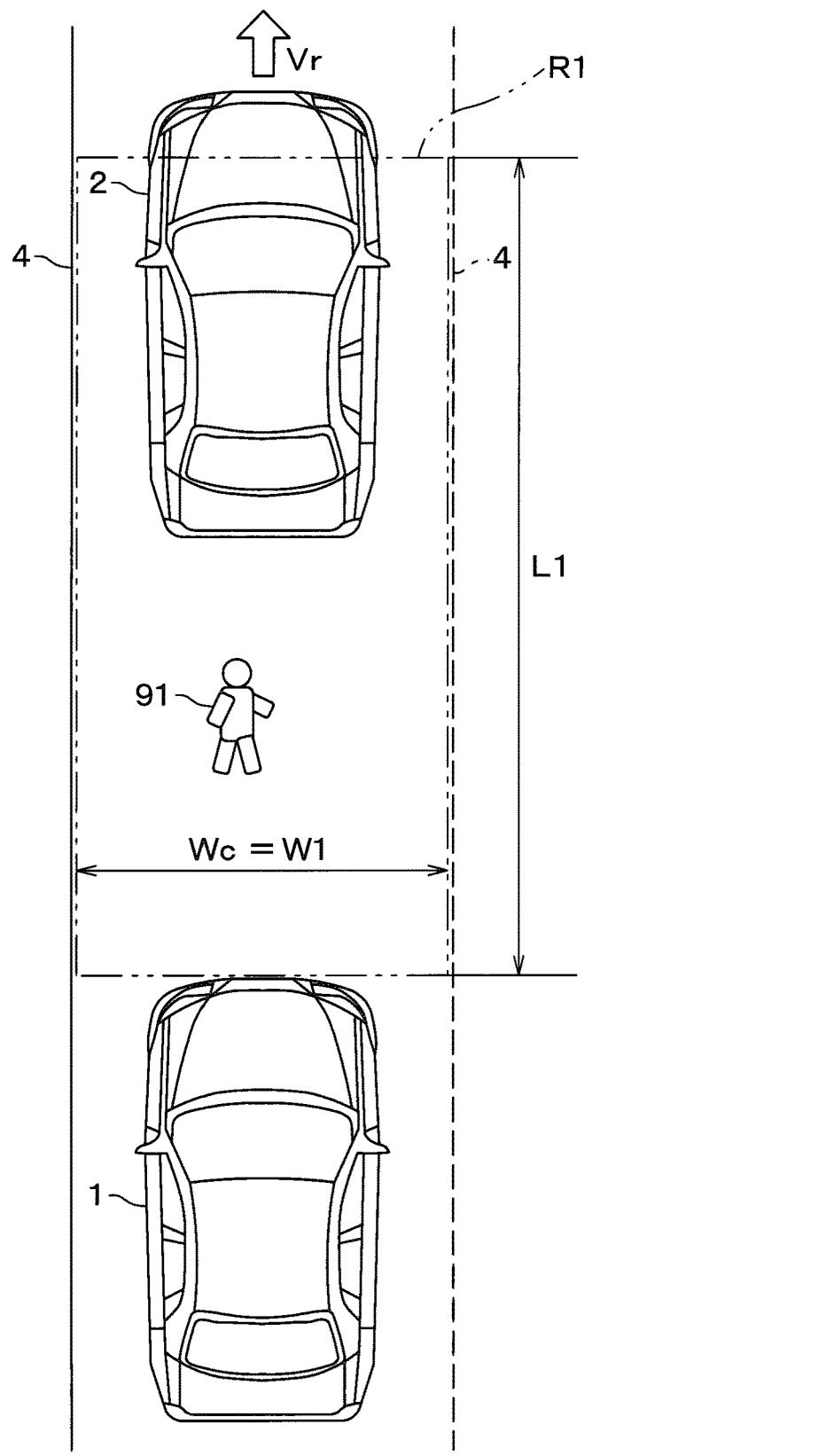
FIG. 10 is a view when a size of the specified area is changed.

Here, the driving assistance device 70 changes the respective sizes of the specified areas R1, R2, R3, R4 and R5 based on the line of sight of the driver of the vehicle 1, the weather, the road surface state and the road information. Here, a state where the line of sight of the driver of the vehicle 1 faces forward is set as a normal state. Further, it is assumed here, for example, that the line of sight of the driver of the vehicle 1 faces sideways, that is, the driver of the vehicle 1 looks away. In this event, the driving assistance device 70 makes the sizes of the specified areas R1, R2, R3, R4 and R5 larger than the sizes in the normal state to make it difficult for the vehicle 1 to automatically start. For example, as illustrated in FIG. 10, the driving assistance device 70 makes the first specified area R1 larger than that in the normal state by increasing the first length L1 of the first specified area R1.

Further, in a case where the amount of insolation Ms is greater than an insolation threshold Ms_th or in a case where the wiper switch 51 is turned off, that is, in a case of the fine weather, the state is set as the normal state. Then, the driving assistance device 70 makes the sizes of the specified areas R1, R2, R3, R4 and R5 larger than the sizes in the normal state to make it difficult for the vehicle 1 to automatically start in a case where the amount of insolation Ms is equal to or less than the insolation threshold Ms_th, that is, in a case of bad weather. Further, the driving assistance device 70 makes the sizes of the specified areas R1, R2, R3, R4 and R5 larger than the sizes in the normal state in a case where the wiper switch 51 is turned on, that is, in a case of bad weather. Note that the insolation threshold Ms_th is set through experiment, simulation, or the like.

Further, in a case where the road surface is neither frozen nor wet, the state is set as the normal state. Then, the driving assistance device 70 makes the sizes of the specified areas R1, R2, R3, R4 and R5 larger than the sizes in the normal state to make it difficult for the vehicle 1 to automatically start in a case where the road surface is frozen or wet, that is, in a case of the bad road surface state.

Further, in a case where the vehicle 1 is located on a general road that is a road other than a limited highway, the state is set as the normal state. Then, the driving assistance device 70 makes the sizes of the specified areas R1, R2, R3, R4 and R5 larger than the sizes in the normal state to make it easier for the vehicle 1 to automatically start in a case where the vehicle 1 is located on a limited highway, for example, in a case where the vehicle 1 is located on a national expressway.

Further, here, in a case where at least one of the above-described conditions is satisfied, the driving assistance device 70 changes the sizes of the specified areas R1, R2, R3, R4 and R5 from the sizes in the normal state as described above.

Further, the driving assistance device 70 changes the shapes of the specified areas R1, R2, R3, R4 and R5 based on the steering angle θc and the ON/OFF state of the turn indicator switch 52.

Here, in a case where the steering angle θc is less than a steering threshold θc_th, for example, in a case where the vehicle 1 goes straight when the vehicle 1 starts, the state is set as the normal state. Then, in a case where the steering angle θc is equal to or greater than the steering threshold θc_th, the driving assistance device 70 changes the shapes of the specified areas R1, R2, R3, R4 and R5 from rectangles that are shapes in the normal state to rectangles along a steering direction of the vehicle 1. Note that the steering threshold θc_th is set through experiment, simulation, or the like.

Figure 11:
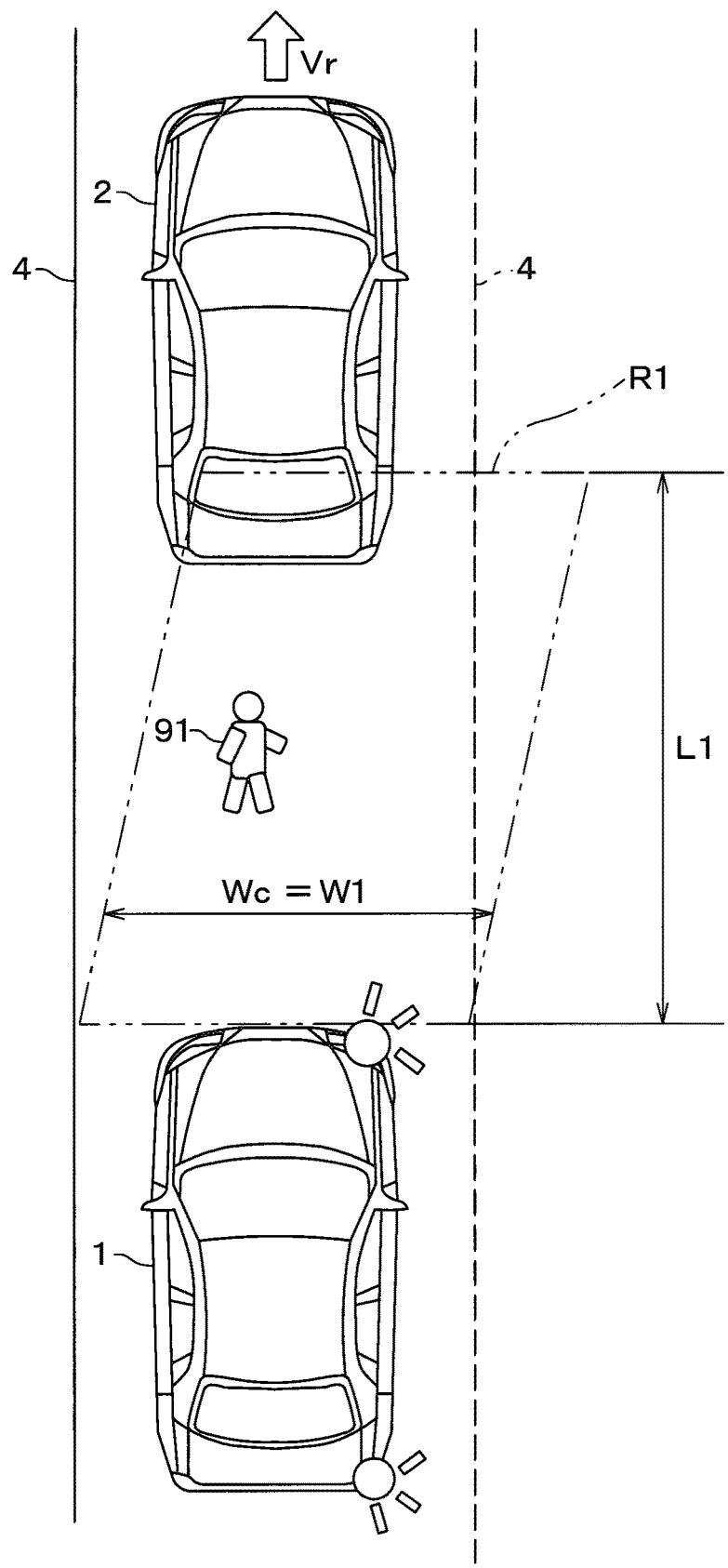
FIG. 11 is a view when a shape of the specified area is changed.

Further, in a case where the turn indicator switch 52 is turned on, the driving assistance device 70 changes the shapes of the specified areas R1, R2, R3, R4 and R5 from rectangles to squares so as to be along a direction of a turn indicator corresponding to the turn indicator switch 52. It is assumed, for example, that the turn indicator switch 52 for turning on a right turn indicator of the vehicle 1 is in an ON state as illustrated in FIG. 11. In this event, the driving assistance device 70 changes the shape of the first specified area R1 to a parallelogram by deforming the rectangle rightward of the vehicle 1 without changing the first width W1 and the first length L1.

Further, in a case where the road on which the vehicle 1 is located is curved by the road information acquired in step S100, the driving assistance device 70 changes the shapes of the specified areas R1, R2, R3, R4 and R5 from the rectangles so as to be along the curve.

Further, in a case where at least one of the above-described conditions is satisfied, the driving assistance device 70 changes the shapes of the specified areas R1, R2, R3, R4 and R5 from the shapes in the normal state as described above.

In this manner, the driving assistance device 70 changes the sizes and the shapes of the specified areas R1, R2, R3, R4 and R5.

A case where the state changes to a state where the vehicle 1 can appropriately automatically start through the processing by the driving assistance device 70 will be described next.

In a case where the preceding vehicle 2 in a stopped state starts, the driving assistance device 70 starts the vehicle 1 in a case where an object is located outside the specified areas R1, R3, R4 and R5. Further, it is assumed that an object is located inside one of the specified areas R1, R3, R4 and R5 as illustrated in FIG. 4, FIG. 7, FIG. 8 and FIG. 9. In this event, the driving assistance device 70 maintains the stopped state of the vehicle 1 even in a case where the preceding vehicle 2 starts. This can avoid collision between the vehicle 1 and an object also due to change of a surrounding environment in a case where the vehicle 1 automatically starts to follow the preceding vehicle 2. Further, this enables the vehicle 1 to appropriately automatically start.

Further, as illustrated in FIG. 2, the driving assistance device 70 maintains the stopped state of the vehicle 1 in a case where it is determined that the second moving object 92 located outside the second specified area R2 approaches the second specified area R2. This can avoid collision between the vehicle 1 and an object also due to change of a surrounding environment. Further, this enables the vehicle 1 to appropriately automatically start.

OTHER EMBODIMENTS

The present disclosure is not limited to the above-described embodiment, and changes can be made as appropriate to the above-described embodiment. Further, it goes without saying that in the above-described embodiment, components that constitute the embodiment are not necessarily essential except a case where it is explicitly described that the components are essential or a case where it can be considered that the components are obviously essential in principle.

The determination unit, and the like, and the method thereof described in the present disclosure may be implemented by a dedicated computer constituted with a processor and a memory programmed to execute one or more functions embodied by a computer program.

Alternatively, the determination unit, and the like, and the method thereof described in the present disclosure may be implemented by a dedicated computer obtained by constituting a processor with one or more dedicated hardware logic circuits. Alternatively, the determination unit, and the like, and the method thereof described in the present disclosure may be implemented by one or more dedicated computers constituted with a combination of a processor and a memory programmed to execute one or more functions and a processor constituted with one or more hardware logic circuits. Further, the computer program may be stored in a computer-readable non-transitory tangible recording medium as instructions to be executed by the computer.

(1) In the above-described embodiment, the self-position estimation sensor 30 uses the GNSS receiver 31. In contrast, the configuration is not limited to a configuration where the self-position estimation sensor 30 uses the GNSS receiver 31. For example, it is also possible to employ a configuration where the map database 33 of the self-position estimation sensor 30 uses a three-dimensional map including feature points of a road shape and a structure as the map data. Further, for example, in a case where this three-dimensional map is used, it is also possible to employ a configuration where the self-position estimation sensor 30 specifies the position of the vehicle 1 using this three-dimensional map and a detection result at the surroundings monitoring sensor 10 such as a LIDAR that detects the feature points of the road shape and the structure. Note that it is also possible to employ a configuration where the map data is acquired from outside of the own vehicle using an in-vehicle communication module mounted on the own vehicle. Further, LIDAR is an abbreviation of light detection and ranging/laser imaging detection and ranging.

(2) In the above-described embodiment, in step S110, the driving assistance device 70 determines whether the preceding vehicle 2 located in front of the vehicle 1 starts based on change of the relative speed Vr of the preceding vehicle 2 with respect to the vehicle 1. In contrast, the determination is not limited to determination based on change of the relative speed Vr of the preceding vehicle 2 with respect to the vehicle 1. For example, the driving assistance device 70 may determine whether the preceding vehicle 2 starts based on change of relative acceleration of the preceding vehicle 2 with respect to the vehicle 1. Further, the driving assistance device 70 may determine whether the preceding vehicle 2 starts based on change of the relative position of the preceding vehicle 2 with respect to the vehicle 1. Still further, the driving assistance device 70 may determine whether the preceding vehicle 2 starts from the camera image acquired from the image sensor 13 in step S100. Further, the driving assistance device 70 may determine whether the preceding vehicle 2 starts based on an accelerator operation state of the preceding vehicle 2 acquired from the communication unit 40. In this case, the communication unit 40 acquires the accelerator operation state of the preceding vehicle 2 through inter-vehicle communication. Further, the driving assistance device 70 may determine whether the preceding vehicle 2 starts based on two or more conditions among the above-described conditions.

(3) In the above-described embodiment, in step S130, the driving assistance device 70 determines whether the first moving object 91 is located within the first specified area R1 based on the relative position of the first moving object 91. In contrast, the determination is not limited to determination based on the relative position of the first moving object 91. For example, the driving assistance device 70 may determine whether the first moving object 91 is located within the first specified area R1 based on the camera image of the image sensor 13. Further, the driving assistance device 70 may determine whether the first moving object 91 is located within the first specified area R1 based on two conditions among the above-described conditions. Note that the driving assistance device 70 may determine whether a stationary object is located within the first specified area R1 as well as determining whether the first moving object 91 is located within the first specified area R1.

(4) In the above-described embodiment, in step S140, the driving assistance device 70 determines whether the second moving object 92 approaches the second specified area R2 based on the relative position and the relative speed of the second moving object 92. In contrast, the determination is not limited to determination based on the relative position and the relative speed of the second moving object 92. For example, in a case where the second moving object 92 is an automobile, the driving assistance device 70 may determine whether the second moving object 92 approaches the second specified area R2 based on a state where the turn indicator of the automobile is turned on. Specifically, in this case, the driving assistance device 70 may determine that the second moving object 92 approaches the second specified area R2 when the second specified area R2 is located on a side of the turn indicator that is turned on among the turn indicators of the automobile. Further, the driving assistance device 70 may determine that the second moving object 92 does not approach the second specified area R2 when the second specified area R2 is located on a side opposite to the turn indicator that is turned on among the turn indicators of the automobile. Note that in this case, the driving assistance device 70 acquires a state where the turn indicator of the automobile is turned on through inter-vehicle communication by the communication unit 40, the camera image by the image sensor 13, or the like.

Figure 12:
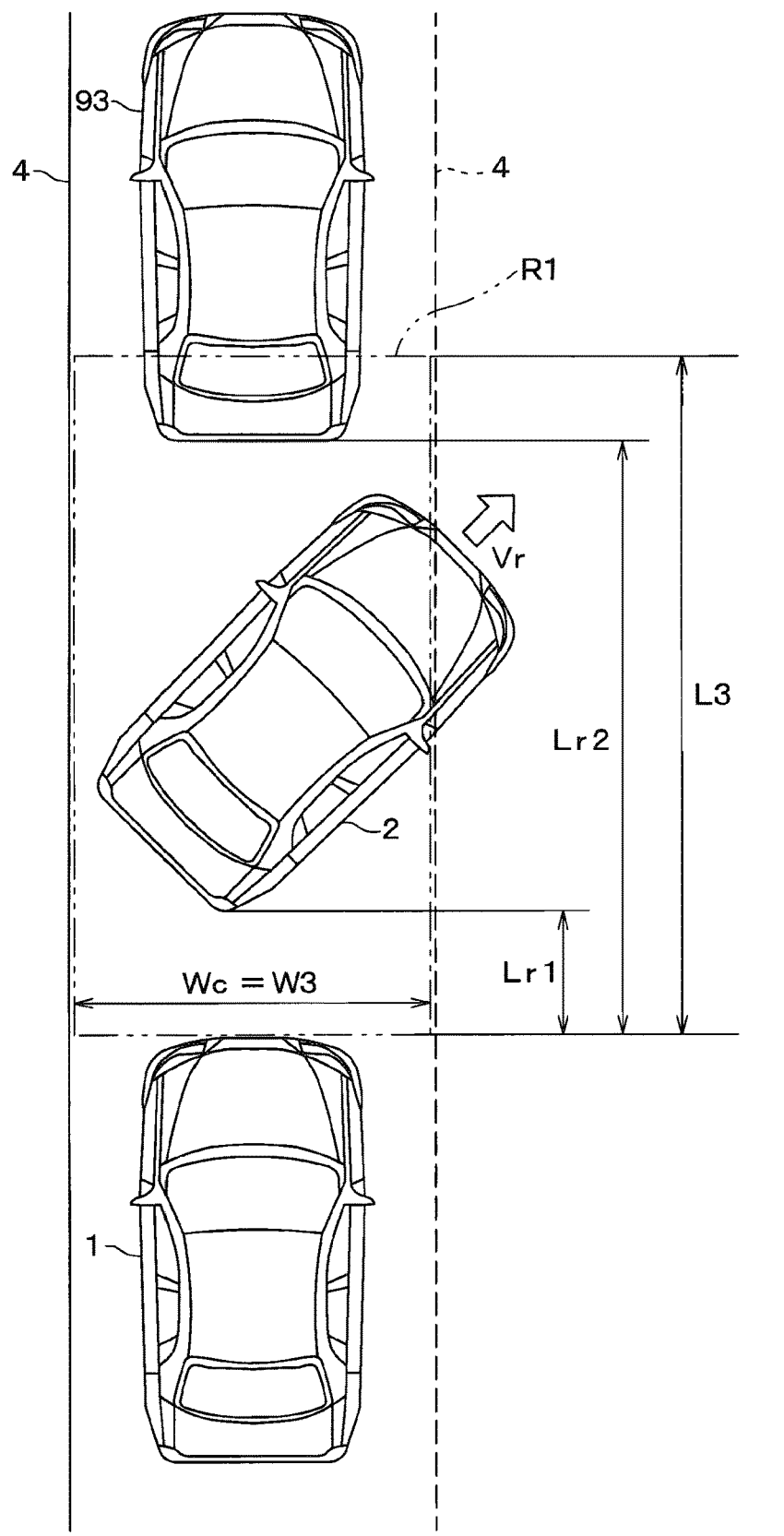
FIG. 12 is a view when an object is located within the specified area.

(5) In the above-described embodiment, the stationary object 93 in step S150 is a stopped four-wheeled vehicle. In contrast, the stationary object 93 in this event is not limited to the stopped four-wheeled vehicle and may be an obstacle other than an automobile. Further, the preceding vehicle 2 in step S150 is a two-wheeled vehicle that starts. In contrast, the preceding vehicle 2 in this event is not limited to the two-wheeled vehicle that starts and may be a four-wheeled vehicle, or the like, that starts as illustrated in FIG. 12. Note that in step S150, the driving assistance device 70 may determine whether a moving object is located in front of the preceding vehicle 2 within the third specified area R3.

(6) In the above-described embodiment, in step S160, the driving assistance device 70 determines whether the traffic light 94 is located within the fourth specified area R4 based on the camera image of the image sensor 13. In contrast, the determination is not limited to determination based on the camera image of the image sensor 13. For example, the driving assistance device 70 may determine whether the traffic light 94 is located within the fourth specified area R4 based on position information of the traffic light 94 acquired from the communication unit 40. Specifically, the communication unit 40 receives infrastructure information from infrastructure devices disposed on the road. Further, the driving assistance device 70 acquires the position information of the traffic light 94 included in the infrastructure information from the communication unit 40 in step S100. Then, in a case where the processing transitions to step S160, the driving assistance device 70 determines whether the acquired position of the traffic light 94 is located within the fourth specified area R4 in step S160. In a case where the position of the traffic light 94 is located within the fourth specified area R4, the processing transitions to step S190. Further, in a case where the position of the traffic light 94 is not located within the fourth specified area R4, the processing transitions to step S170.

Figure 13:
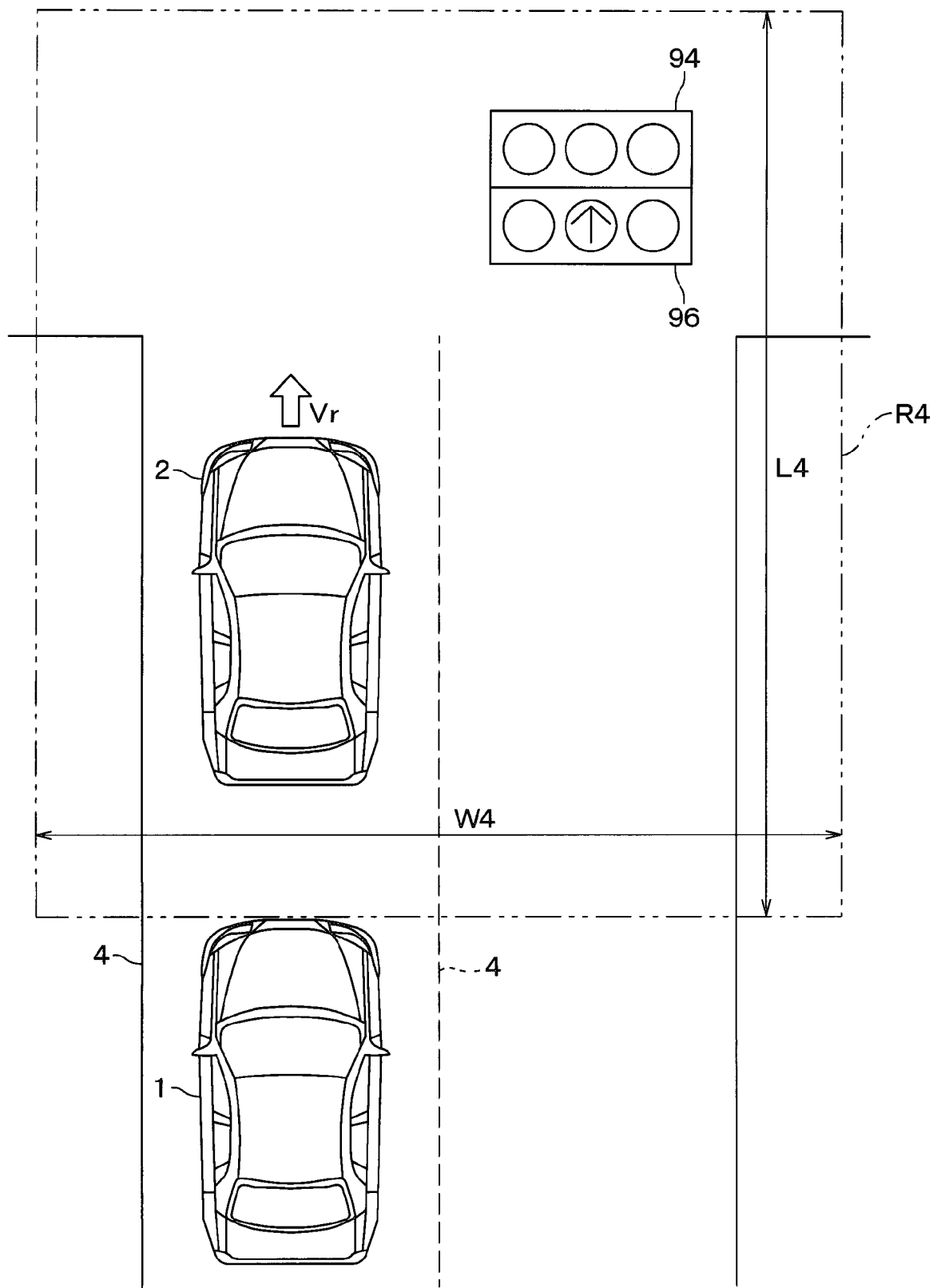
FIG. 13 is a view when a traffic light is located within the specified area.

Further, as illustrated in FIG. 13, the traffic light 94 may include an arrow light 96. For example, there is a case where the arrow light 96 is lit even when the red light of the traffic light 94 is lit. In this event, when a starting direction of the preceding vehicle 2 matches a direction indicated by the arrow light 96 of the traffic light 94 within the fourth specified area R4, the processing of the driving assistance device 70 may transition to step S170. Further, when the starting direction of the preceding vehicle 2 is different from the direction indicated by the arrow light 96 of the traffic light 94 within the fourth specified area R4, the processing of the driving assistance device 70 may transition to step S190.

(7) In the above-described embodiment, in step S170, the driving assistance device 70 determines whether a railway crossing 95 is located within the fifth specified area R5 based on the camera image of the image sensor 13. In contrast, the determination is not limited to determination based on the camera image of the image sensor 13. For example, the driving assistance device 70 may determine whether a railway crossing 95 is located within the fifth specified area R5 based on position information of the railway crossing 95 acquired from the communication unit 40. Specifically, in a similar manner to the above, the communication unit 40 acquires the infrastructure information. Then, the driving assistance device 70 acquires the position information of a railway crossing 95 included in the infrastructure information from the communication unit 40 in step S100. Then, in a case where the processing transitions to step S170, when the driving assistance device 70 determines in step S170 that the acquired position of a railway crossing 95 is located within the fifth specified area R5, the processing transitions to step S190. Further, when the position of the railway crossing 95 is not within the fifth specified area R5, the processing transitions to step S180.

(8) In the above-described embodiment, the driving assistance device 70 acquires the relative speed Vr of the preceding vehicle 2 with respect to the vehicle 1 from the search wave transmission/reception unit 14. In contrast, acquisition of the relative speed Vr of the preceding vehicle 2 with respect to the vehicle 1 by the driving assistance device 70 is not limited to acquisition from the search wave transmission/reception unit 14. For example, the driving assistance device 70 may calculate the relative speed Vr of the preceding vehicle 2 with respect to the vehicle 1 based on the speed of the vehicle 1 from the vehicle speed sensor 21 and other vehicle information from the communication unit 40. Specifically, the driving assistance device 70 acquires the speed of the vehicle 1 from the vehicle speed sensor 21 in step S100. Further, the driving assistance device 70 acquires speed of the preceding vehicle 2 that is acquired through inter-vehicle communication by the communication unit 40, from the communication unit 40 in step S100. Still further, the driving assistance device 70 calculates the relative speed Vr of the preceding vehicle 2 with respect to the vehicle 1 based on the speed of the vehicle 1 and the speed of the preceding vehicle 2.

(9) In the above-described embodiment, the vehicle 1 includes an internal combustion engine. In contrast, the vehicle 1 is not limited to a vehicle including an internal combustion engine. For example, the vehicle 1 may be an electric vehicle such as an electric automobile and a hybrid automobile or a fuel cell automobile.

What is claimed is:

1. A driving assistance device comprising:
   a processor;
   a non-transitory computer-readable tangible recording medium; and
   a set of computer-executable instructions stored on the non-transitory computer-readable tangible recording medium that cause the processor to:
   determine that a first vehicle, which is located in front of a second vehicle and in a stopped state, has moved forward relative to the second vehicle from the stopped state;
   determine that an object is located inside a specified area, the specified area comprising a predetermined area in front of the second vehicle; and
   control brakes of the second vehicle to maintain the second vehicle in a stopped state,
   wherein the set of computer-executable instructions further cause the processor to:
   determine that the object located inside the specified area is a traffic light;
   determine which light of the traffic light is illuminated; and
   start an engine of the second vehicle for a state in which a green light of the traffic light is illuminated or control the brakes of the second vehicle to maintain the second vehicle in the stopped state for a state in which a red light or a yellow light of the traffic light is illuminated,
   wherein the set of computer-executable instructions further cause the processor to:
   determine that the object located inside the specified area is a railway crossing; and
   control the brakes of the second vehicle to maintain the second vehicle in the stopped state based on the object being a railway crossing and the first vehicle having moved forward relative to the second vehicle from the stopped state,
   wherein a size of the specified area to determine that the object located inside the specified area is the traffic light is larger than the size of the specified area to determine that the object located inside the specified area is the railway crossing.

2. The driving assistance device according to claim 1,
   wherein the set of computer-executable instructions further cause the processor to:
   determine whether an object outside the specified area approaches the specified area in a case where the object is located outside the specified area; and
   maintain the stopped state of the second vehicle in a case where the object outside the specified area approaches in a case where the object is located outside the specified area.

3. The driving assistance device according to claim 1, wherein the set of computer-executable instructions further cause the processor to: an area change unit configured to change a size of the specified area based on one of a state of a driver of the second vehicle, an amount of insolation of outside of the second vehicle, and an ON/OFF state of a wiper switch of the second vehicle.

4. The driving assistance device according to claim 3,
   wherein the set of computer-executable instructions further cause the processor to change a shape of the specified area based on one of an ON/OFF state of a turn indicator switch of the second vehicle and a steering angle of the second vehicle.

5. The driving assistance device according to claim 1, wherein the size of the specified area to determine that the object located inside the specified area is the traffic light is larger than a size of the specified area to be determine that the object located inside the specified area is a moving object.

6. A driving assistance method comprising:
   determining that a first vehicle located in front of a second vehicle is in a stopped state and has moved forward relative to the second vehicle;
   determining that an object is located inside a specified area, the specified area comprising a predetermined area in front of the second vehicle; and
   controlling brakes of the second vehicle to maintain the second vehicle in a stopped state,
   wherein the method further comprises:
   determining that the object located inside the specified area is a traffic light;
   determining which light of the traffic light is illuminated; and
   starting an engine of the second vehicle for a state in which a green light of the traffic light is illuminated or control the brakes of the second vehicle to maintain the second vehicle in the stopped state for a state in which a red light or a yellow light of the traffic light is illuminated,
   wherein the driving assistance method further comprises:
   determining that the object located inside the specified area is a railway crossing; and
   controlling the brakes of the second vehicle to maintain the second vehicle in the stopped state based on the object being a railway crossing and the first vehicle having moved from the stopped state,
   wherein a size of the specified area to determine that the object located inside the specified area is the traffic light is larger than the size of the specified area to determine that the object located inside the specified area is the railway crossing.

* * * * *